Feb. 24, 1953   C. H. McVEY   2,629,616
COLLAR FASTENER
Filed March 9, 1950

INVENTOR.
CLARENCE H. McVEY
BY
ATTORNEYS.

Patented Feb. 24, 1953

2,629,616

UNITED STATES PATENT OFFICE 2,629,616

COLLAR FASTENER

Clarence H. McVey, Laconia, N. H., assignor to Scott & Williams, Incorporated, Laconia, N. H., a corporation of Massachusetts Application March 9, 1950, Serial No. 148,698

4 Claims. (Cl. 287—52.08)

1

This invention relates to an improvement in means for mounting a collar on a shaft.

The use of set screws to secure collars to shafts in conventional fashions to prevent relative axial movements between the shafts and collars has various disadvantages. If the shaft is hardened, the slightest backing out of the set screw will release the collar from the shaft; if the shaft is soft, its surface will be deformed by the set screw and if a change of axial adjustment is required the deformation will tend to prevent accurate readjustment. Furthermore, in either case, fine axial adjustment of the collar relative to the shaft must be attained independently of the set screw itself since the setting of the screw has no definite relationship to the axial adjustment.

It is the broad object of the present invention to provide means for axially fixing a collar on a shaft, whether the shaft is hard or soft, so that axial adjustment and readjustment may be attained readily and accurately, set screws providing, in effect, for micrometric adjustment of the axial relationship between the collar and the shaft, while, once adjustment has been completed, the adjustment will be held even if the shaft is of hardened metal. The adjustment is maintained without any requirement that the set screws should bite into the shaft, and in fact the set screws may have smooth plane ends to avoid their deformation of the material of the shaft.

Figure 1:
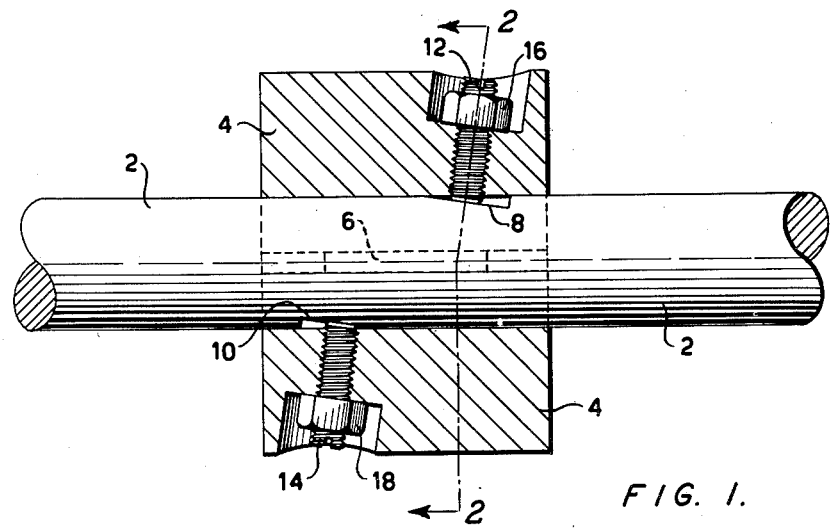
Figure 2:
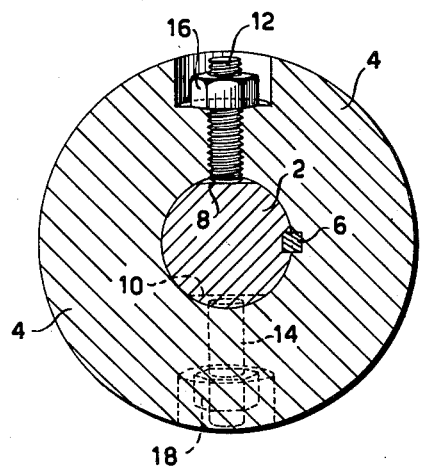

The foregoing broad object and other objects of the invention relating to details of construction will become apparent from the following description when read in conjunction with the accompanying drawing in which:

Figure 1 is an axial section through a collar and shaft arrangement embodying the invention; and Figure 2 is a transverse section taken on the plane defined by the trace 2—2 in Figure 1.

Referring to the figures there is shown a shaft 2 on which is mounted a collar 4 which is caused to rotate with the shaft by means of the key 6, though this key may be omitted, as will appear hereafter, if rotation of the collar with the shaft is sufficiently imposed by the engagement of the set screws hereafter referred to. The shaft, collar, and key assembly represent conventional machine elements, the shaft and the collar rotating together. While the collar is shown in simple form it will be apparent that the collar may be constructed to take the form of a cam, a gear, or other similar conventional machine part or of a hub for such part.

The shaft surface is provided with the inclined plane surfaces 8 and 10 milled or otherwise machined thereon and the collar is provided with the set screws 12 and 14, threaded therein at angles so that their axes will be approximately normal to the surfaces 8 and 10 after assembly. The end surfaces of the set screws 12 and 14 are adapted to engage the inclined surfaces 8 and 10, respectively. The lock nuts 16 and 18 are provided to lock the set screws 12 and 14, respectively, in position in the collar.

When the collar 4 is to be mounted upon the shaft 2, the screws 12 and 14 will be turned to retracted positions and the collar 4 will be placed over shaft 2 and key 6 and positioned in approximately its proper operating position. After the collar 4 has been thus positioned, the set screws 12 and 14 will be screwed inwardly until their ends engage the surfaces 8 and 10, respectively. It will be apparent that, after the collar and set screws are thus positioned, motion of the collar to the left as viewed in Figure 1 will be prevented by the engagement of the end of the set screw 12 with the inclined plane 8, and that movement of the collar to the right will be prevented by engagement of the end of the set screw 14 with the inclined plane 10. Thus, when both the set screws have been turned downwardly and have their end surfaces bearing against their respective associated inclined planes, longitudinal motion of the collar along the shaft is prevented.

If after the collar has been mounted to the shaft its adjustment is not precisely what it should be, correction of its position can be easily made with great accuracy. For example, assuming it is desired to move the collar to the left on the shaft 2, the set screw 12 will be backed off to provide clearance between the end surface of the set screw 12 and the inclined plane 8. The collar can now be moved to the left until the end of the set screw 12 engages the rising plane 8. Thus, if only a small adjustment is required, the screw 12 would be backed off only a fraction of a turn, whereas if a greater motion to the left is desired, the screw 12 would be correspondingly backed off to a greater degree. It will be apparent that in actual practice a mechanic in the process of accurately positioning the collar 4 on the shaft 2 could simultaneously free the set screw 12 and tap the right-hand side of the collar 4 thus moving the collar to the left very gradually and in minute increments of distance until the precise desired position of the collar 4 upon the shaft 2 was obtained. After the final desired position is attained, the collar may be readily locked in position by tightening the opposing screw 14 against its cooperating inclined plane 10. Lock nuts 16 and 18 may then be tightened to maintain the adjustment secured.

It will be evident that this invention provides means whereby a member incorporating the elements described above may be very accurately positioned upon the shaft without requiring the use of special tools or without in any way requiring the disassembly of the parts involved.

While the inclined plane surfaces 8 and 10 and their cooperating set screws 12 and 14 are shown in the preferable balanced arrangement of approximately diametrically oppositely disposed positions across the shaft, it will be apparent that they may be disposed in various relative positions about the circumference of the shaft or that they may be disposed in line on one side of the shaft.

It may be noted that when the axes of the screws are substantially normal to the planes of surfaces 8 and 10, the tightening of a screw does not cause axial movement of the collar along the shaft. Accordingly this condition is desirable though not absolutely necessary. For very fine adjustment it is, of course, desirable to increase the angle of the inclined plane surfaces with respect to the shaft axis.

An important feature of the present invention resides in the fact that flat end surfaces of the set screws are in plane engagement with flat surfaces of the inclined planes. This engagement of plane surfaces provides resistance against deformation of the engaging parts. Such resistance does not exist if the engagement between the parts is merely line contact.

It should be noted that, for simplicity, the set screws 12 and 14 have been shown perpendicularly disposed with respect to the surfaces of their cooperating planes 8 and 10, respectively, in order to provide surface engagement between the ends of the set screws and their associated inclined plane surfaces. However, it will be apparent that a non-rotating follower may be employed between the end of each set screw and its associated inclined plane surface and that, by reason of use of such a follower, the set screw may, if desired, be radially disposed, and the end of the follower formed at an angle in order to provide surface engagement between the end surface of the follower and the inclined plane associated therewith.

What is claimed is:

1. In combination a shaft, a collar mounted thereon, and means for locking the collar on the shaft in an axially adjusted position thereon, said means including a pair of plane surfaces formed on the shaft, said surfaces being inclined with respect to the lognitudinal axis of the shaft with outwardly extending normals from said surfaces deviating in opposite directions from planes normal to the axis of the shaft, and a pair of members adjustably mounted in the collar, each of the members being positioned to engage one of the inclined surfaces.

2. In combination a shaft, a collar mounted thereon, and means for locking the collar on the shaft in an axially adjusted position thereon, said means including a pair of plane surfaces formed on the shaft, said surfaces being inclined with respect to the longitudinal axis of the shaft with outwardly extending normals from said surfaces deviating in opposite directions from planes normal to the axis of the shaft, and a pair of members adjustably mounted in the collar, each of the members being positioned to engage one of the inclined surfaces and to be adjustable perpendicular thereto.

3. In combination a shaft, a collar mounted thereon, and means for locking the collar on the shaft in an axially adjusted position thereon, said means including a pair of plane surfaces formed on the shaft, said surfaces being inclined with respect to the longitudinal axis of the shaft with outwardly extending normals from said surfaces deviating in opposite directions from planes normal to the axis of the shaft, and a pair of members adjustably mounted in the collar, each of the members being positioned to engage one of the inclined surfaces and each of the plane surfaces being of substantially greater area than the cross sectional area of the member in engagement therewith.

4. In combination a shaft, a collar mounted thereon, and means for locking the collar on the shaft in axially adjusted position thereon, said means including a pair of plane surfaces on the shaft inclined with respect to the longitudinal axis of the shaft, the plane surfaces being formed in substantially opposite sides of the shaft with respect to the axis of the shaft and being substantially parallel to each other, and a pair of members adjustably mounted in the collar, each of the members being positioned to engage one of the inclined surfaces.

CLARENCE H. McVEY.

REFERENCES CITED

The following references are of record in the file of this patent:

UNITED STATES PATENTS

| Number | Name | Date |
| --- | --- | --- |
| 349,005 | Sargent | Sept. 14, 1886 |
| 1,940,455 | Kilpela | Dec. 19, 1933 |